April 24, 1956 H. MELDER 2,742,674
HOUSING FOR POWER VEHICLES
Filed Aug. 29, 1950
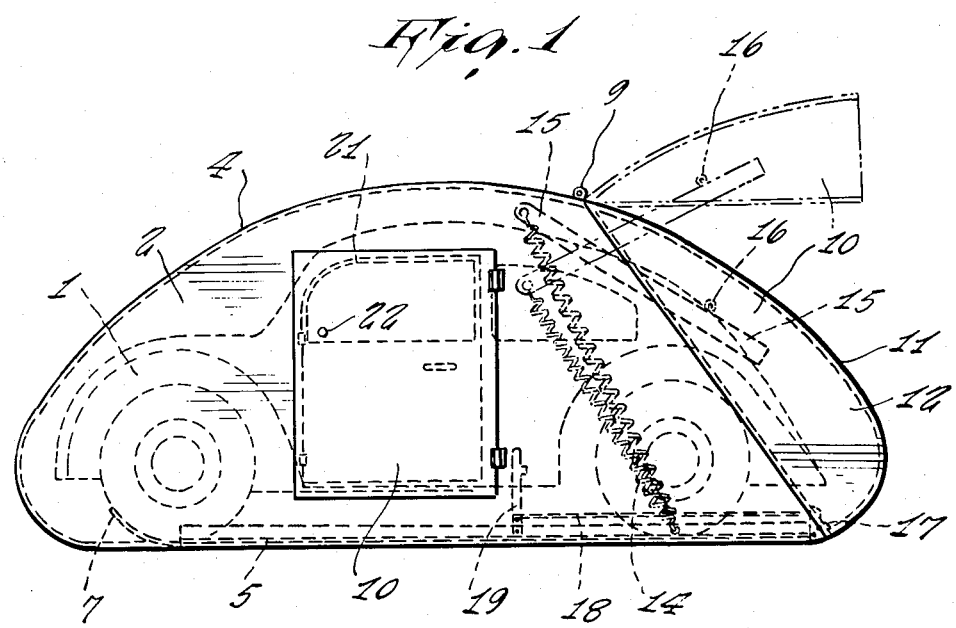
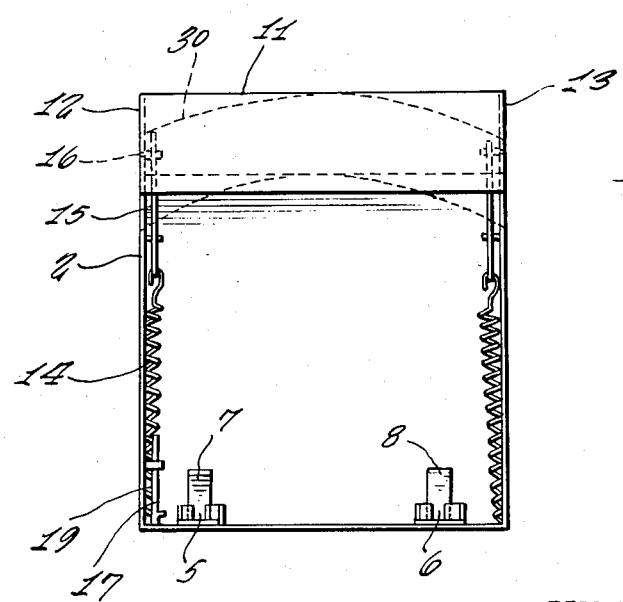
INVENTOR.
HUGO MELDER

# United States Patent Office 2,742,674
Patented Apr. 24, 1956

2,742,674

HOUSING FOR POWER VEHICLES

Hugo Melder, Aufhausen, near Starnberg am See, Germany

Application August 29, 1950, Serial No. 182,004

1 Claim. (Cl. 20—1.13)

This invention relates to a housing for power vehicles which conforms approximately to the size and shape of the vehicle to be housed, and is such that there is just room for the vehicle in it without any substantial amount of superfluous space.

It is therefore possible to make the housing extremely small so that it occupies little space and yet affords a good protection and also is not an eye-sore. Further, the housing may be so constructed that, when the vehicle is driven in or out, the driver need not get out of and into the vehicle unnecessarily, because the door opens automatically when the vehicle is driven in and out of the housing.

To this end, in accordance with the invention, the housing consists of a light, rigid, transportable casing, which can be taken to pieces and is of approximately the same size as the vehicle, and of which a part of its peripheral wall extending from the bottom is hinged for permitting the vehicle to be driven in and out, and one or both the side walls is provided with a door, the size of which is at least equal to that of the vehicle door which opens into the doorway in the side. Owing to the fact that, for the light and rigid construction of the housing, there is used a wooden frame covered with tinned iron sheet and, for the hinged door, a tubular aluminium frame covered with aluminium sheet and no foundations are necessary, the housing can be easily transported and erected on any flat surface. The door by which the vehicle enters and leaves the housing is formed by a part of the peripheral wall of the housing which extends from the bottom and is hinged, preferably about a horizontal pivot to the upper part of the rigid peripheral wall, so that the door opens upwardly. In accordance now with a further feature of the invention, the door is opened under the action of a tensile force, for example a tension spring or a counterweight, and is held thereby in the open position, and is secured in its closed position by a releasable latch. Owing to this arrangement of the door, it is possible by providing in the track of the vehicle an actuating member which is connected to the latch or to the hinged door by means of a rod or a rope, for the door to be opened and closed automatically when the vehicle is driven into and out of the housing. The track inside the housing consists of two rails, the distance between which is equal to the track width of the vehicle wheels. The rails are fixed to the housing and are bent upwardly at least at their inner edges, so that the vehicle must be driven exactly into the middle of the housing.

A door which is provided in the side wall of the housing and is of a size such that the vehicle door can open into the doorway enables the driver to enter and leave the vehicle when the hinged door is closed. Each door can be locked by means of a safety lock preferably of the kind generally used in motor vehicles. In the vicinity of the side door there is provided an operating lever which is connected by means of intermediate members to the latch, whereby the hinged door can be unlatched for driving out of the housing.

In order to economise in space, weight and materials a housing can be manufactured to conform to every type of power vehicle. For reasons of cost, however, it is preferable to construct only three different types of housings for small, medium and large vehicles.

In order that the invention may be easily understood and readily carried into effect, three forms of housing in accordance with the invention, are illustrated, by way of example, in the accompanying drawings, in which:

Figure 1 is a side view of the housing in the closed position showing in dotted lines the door opened;

Figure 2 is an end view of the housing shown in Figure 1.

Referring to the drawing, the housing corresponds in shape approximately to the shape of a streamlined motor car. The size of the housing is such there is just room for the car 1 inside it. It has two side walls 2 and 3 which are plane and upright. The peripheral wall 4 extends over the entire upper part of the housing and down to the bottom of the front and rear ends of the housing. The bottom is, therefore, not closed by continuous floor or cover. At the bottom there are only two rails 5 and 6 which are rigidly connected with a rigid part of the housing and are spaced apart by a distance corresponding to the wheel-track of the car. The rails 5 and 6 in the form illustrated are of U-shape and are arranged symmetrically in the housing so that the car must be driven exactly in the middle of the housing. For this purpose it is sufficient if only the inner edges of the rails are bent upwardly. At their inner ends the rails are provided with curved portions 7 and 8 by which the position of the vehicle in the housing is fixed and which act as a brake or stop when the vehicle is driven into the housing.

At the rear end of the housing a part of the peripheral wall can be raised upwardly so far as to allow the vehicle to be driven into the housing. The pivot or hinge 9 of the door 10 is therefore situated near the middle of the housing when viewed in cross section. In the form of a construction according to Figure 1, the door 10 is formed by the part 11 of the peripheral wall and the segment shaped parts 12, 13 of the two side walls 2, 3. The door 10 is acted upon by a tension spring 14 the strength of which is such that, when unlatched, it opens automatically and is held in a horizontal open position. The spring 14 acts on one end of a two armed lever 15 which is pivoted to the side walls 2, 3, or to a stiffening frame, and its other end engages a roller 16 which is rotatably mounted in the side walls 12, 13 of the door 10. The door 10 is held in the closed position by means of a latch 17 which is acted upon by a spring. The latch 17 is connected by means of a rod 18 with a lever 19 which is pivoted to side wall 2. The lever 19 is arranged near a door 20 in the side wall 2 and/or the wall 3. Each side door 20 must be of such a size and be situated in such a position that the car door 21 swings into the door opening of the door 20 and can be fully opened for getting into and out of the car. It can be locked by means of a safety lock 22 and its hinges are preferably on the opposite side to the hinges of the car.

In order to make the housing as light as possible but nevertheless sufficiently strong, the housing is made of sheet material with a wooden or light metal frame. Tinned sheet iron or a wooden frame is preferably used for the fixed part of the housing, and aluminium sheet with a tubular aluminium frame is used for the door in order to keep its weight as small as possible. The bottom of the housing can, of course, also be lined with sheet material. The peripheral wall can be straight in cross-section or can be rounded to correspond with the shape of the car as indicated by the dotted lines 30 in Figure 2. In order to be able to transport the box easily, it can be taken to pieces. For this purpose the peripheral wall is detachably connected to the side walls. In addition to this the side walls may consist of two or more parts which can be detachably connected together. Preferably each side wall 2, 3 is provided with a side door 20 in order to permit entry and exit on each side. Levers 19 can be provided on both sides near these doors for releasing the latches 17.

If the car is to be driven out of the closed housing the side door is opened, and the latch 17 is released by means of the lever 19 so that the door 10 opens under the action of the spring. Then, after opening the car door, the driver enters the car and drives out of the housing. In the form illustrated in Figures 1 and 2, the door 10 must be closed by hand. When driving the car into the housing a similar procedure is adopted.

I claim:

A knockdown housing for a power vehicle comprising a rigid transportable casing of streamlined external shape and of a size conforming substantially to the shape and size of the streamlined vehicle, said casing having two parallel curved side walls having similar arcuate top edges and straight bottom edges, and a roof curved throughout its length to conform with the upper edges of said side walls, said roof comprising a front part forming the main door for the vehicle, a hinge horizontally extending in the plane of said roof from wall to wall and secured to an edge of said door, said door having a transverse portion which in the closed position of said door extends from said hinge downwardly and inwardly in a curved path, said door including similar side members which in the closed position of said door engage edges of said side walls, each of said side walls together with a corresponding side member constituting in effect a segment shaped side when said door is in the closed position, said door in its closed position thereby adding to the volumetric capacity of said casing and being adapted to receive between said side members a portion of the vehicle, means coacting with said hinge and capable of moving said door over an arcuate path to open and closed positions, counterbalancing means inside said walls and closely adjacent at least one of said walls for holding the door in open position, a releasable spring-actuated latch attached to the stationary part of the housing capable of bolting said door in closed position, a door in at least one of the side walls of the housing, and a lever pivotally mounted on the housing near the side door and means connecting said lever to said latch whereby said latch may be actuated.

References Cited in the file of this patent

UNITED STATES PATENTS

| | | |
|---|---|---|
| 1,630,553 | Watson | May 31, 1927 |
| 2,282,324 | Everitt | May 12, 1942 |
| 2,319,612 | Lichtfeldt | May 18, 1943 |
| 2,358,747 | Teetor | Sept. 19, 1944 |
| 2,396,610 | Schulze | Mar. 12, 1946 |
| 2,531,119 | Everitt | Nov. 21, 1950 |

FOREIGN PATENTS

| | | |
|---|---|---|
| 643,994 | France | May 26, 1928 |

OTHER REFERENCES

Popular Mechanics, July 1947, page 143.